(12) United States Patent
Hermann

(10) Patent No.: US 7,876,451 B2
(45) Date of Patent: Jan. 25, 2011

(54) POSITION-MEASURING DEVICE WITH MOVABLE DEFLECTION DEVICE AND GRATING AND WITH STATIONARY GRATING, LIGHT SOURCE, AND DETECTOR

(75) Inventor: Michael Hermann, Tacherting (DE)

(73) Assignee: Dr, Johannes Heidenhain GmbH, Traunreut (DE)

( * ) Notice: Subject to any disclaimer, the term of this patent is extended or adjusted under 35 U.S.C. 154(b) by 330 days.

(21) Appl. No.: 12/120,113

(22) Filed: May 13, 2008

(65) Prior Publication Data
US 2008/0285050 A1 Nov. 20, 2008

Related U.S. Application Data

(60) Provisional application No. 60/938,285, filed on May 16, 2007.

(30) Foreign Application Priority Data

| May 16, 2007 | (DE) | ........................ 10 2007 023 305 |
| Feb. 13, 2008 | (DE) | ........................ 10 2008 008 873 |

(51) Int. Cl.
*G01D 5/34* (2006.01)
*G01B 11/02* (2006.01)

(52) U.S. Cl. .................................. 356/499; 250/231.16
(58) Field of Classification Search ................ 356/488, 356/494, 499, 521; 250/231.16, 237 G
See application file for complete search history.

(56) References Cited

U.S. PATENT DOCUMENTS

| 4,776,701 | A | | 10/1988 | Pettigrew | |
| 5,283,434 | A | * | 2/1994 | Ishizuka et al. | ......... 250/231.16 |
| 5,327,218 | A | * | 7/1994 | Igaki | ........................... 356/499 |
| 5,760,959 | A | * | 6/1998 | Michel et al. | ............... 356/499 |
| 5,812,320 | A | * | 9/1998 | Maeda | ......................... 356/499 |

FOREIGN PATENT DOCUMENTS

| EP | 0 163 362 | 12/1985 |
| WO | WO 2007/034379 | 3/2007 |

* cited by examiner

*Primary Examiner*—Patrick J Connolly
(74) *Attorney, Agent, or Firm*—Kenyon & Kenyon LLP

(57) ABSTRACT

A position-measuring device includes a light source, a first grating, a second grating and photodetectors, light from the light source, which is split into partial beams of different directions at the first and second grating, being directed via a deflecting element to the detector. The deflecting element for incident partial beams having different directions has different regions, so that all partial beams directed from the deflecting element to the detector are approximately parallel.

15 Claims, 8 Drawing Sheets

23.2   23.1   23.3

POSITION-MEASURING DEVICE WITH MOVABLE DEFLECTION DEVICE AND GRATING AND WITH STATIONARY GRATING, LIGHT SOURCE, AND DETECTOR

CROSS-REFERENCE TO RELATED APPLICATIONS

The present application claims the benefit of U.S. Provisional Patent Application Ser. No. 60/938,285, filed on May 16, 2007, which is expressly incorporated herein in its entirety by reference thereto.

The present application claims priority to Application No. 10 2007 023 305.3, filed in the Federal Republic of Germany on May 16, 2007, and to Application No. 10 2008 008 873.0, filed in the Federal Republic of Germany on Feb. 13, 2008, each of which is expressly incorporated herein in its entirety by reference thereto.

FIELD OF THE INVENTION

The present invention relates to a position-measuring device.

BACKGROUND INFORMATION

Interferential position-measuring devices based on the scanning of scales having optical diffraction gratings are described, for example, in the European Patent No. 0 163 362.

A position-measuring device based on scales having grating structures and optical scanning is also described in PCT International Published Patent Application No. WO 2007/034379. However, the position-measuring device described in PCT International Published Patent Application No. WO 2007/034379 has the disadvantage that partial beams of different direction reflected at a deflecting element do not travel in parallel to the detector, and therefore their point of incidence at the detector is dependent on the distance of the deflecting element from the detector.

SUMMARY

Example embodiments of the present invention provide a position-measuring device in which the point of incidence of partial beams reflected at a deflecting element is independent of the distance of the deflecting element to the detector.

According to an example embodiment of the present invention a position-measuring device includes: a light source; a first grating; a second grating; a detector; and a deflection device configured to direct light from the light source, split into partial beams of different directions at the first grating and the second grating, to the detector. The deflection device includes different regions for incident partial beams having different directions to direct all partial beams from the deflection device to the detector approximately in parallel.

The different regions may be differently inclined mirror surfaces of a segmented mirror.

An inclination difference between the mirror surfaces may be constant.

The segmented mirror may include a plurality of coated lamellae secured on a substrate that predetermines different inclinations.

The segmented mirror may be an integral piece.

The different regions may include grating structures, each having different graduation periods.

The grating structures of the different regions may be arranged as reflective phase gratings.

The grating structures of the different regions may be arranged as multi-step phase gratings.

One region of the deflection device may be configured to direct the light from the light source to the first grating.

The first grating may be arranged as a transmitting phase grating.

The second grating may be arranged as a reflective phase grating to reflect light transmitted from the first grating back to the first grating.

The deflection device and the first grating may be movable together with an object to be measured, and the second grating, the light source, and the detector may be stationary.

The position-measuring device may include diaphragm stop structures arranged on both sides of the first grating, and the diaphragm stop structures may be configured to partially block light reflected from the second grating.

The deflection device may include three different regions arranged so that light on three spatially separate and parallel paths falls on three photodetectors.

The three photodetectors may be arranged to form signals out of phase by 120 degrees relative to each other.

Further features and aspects of example embodiments of the present invention are described in more detail below with reference to the appended Figures.

DETAILED DESCRIPTION

Figure 8:
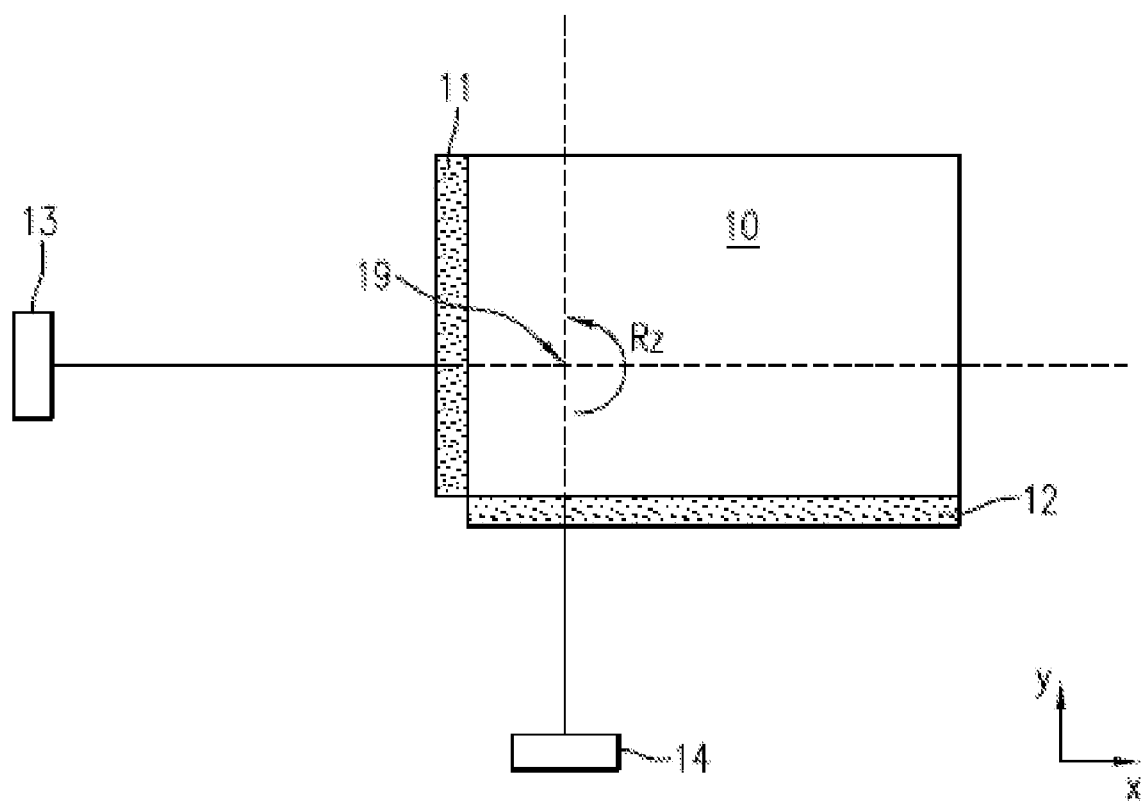
FIG. 8 illustrates a conventional position-measuring device.

A typical measuring task for a position-measuring device is illustrated in FIG. 8. In that case, an object 10 is moved in the plane in the x-direction and the y-direction. The position measurement in the x-direction and y-direction of this object is intended to be performed in relation to one point, hereinafter referred to as a center point 19.

If the measurement of the x-position and y-position is performed in extension of the parallels of the x-axis or the parallels of the y-axis through the center point, one speaks of an Abbe-compensated measurement, since a rotation Rz of the object about the center point has no influence on the position value. Interferometers are usually used for such measuring tasks, measuring reflectors 11 and 12 being secured to the movable object, and in each case extending perpendicular to the measuring direction. This ensures that in response to movement of the object perpendicular to the measuring direction, the interferometer beam is always reflected back to evaluation units 13 and 14.

Since the measuring beam of the interferometer must cover distances in air of several millimeters up to meters, fluctuations in the refractive index of the air play a very critical role in the measurement result.

Figure 1:
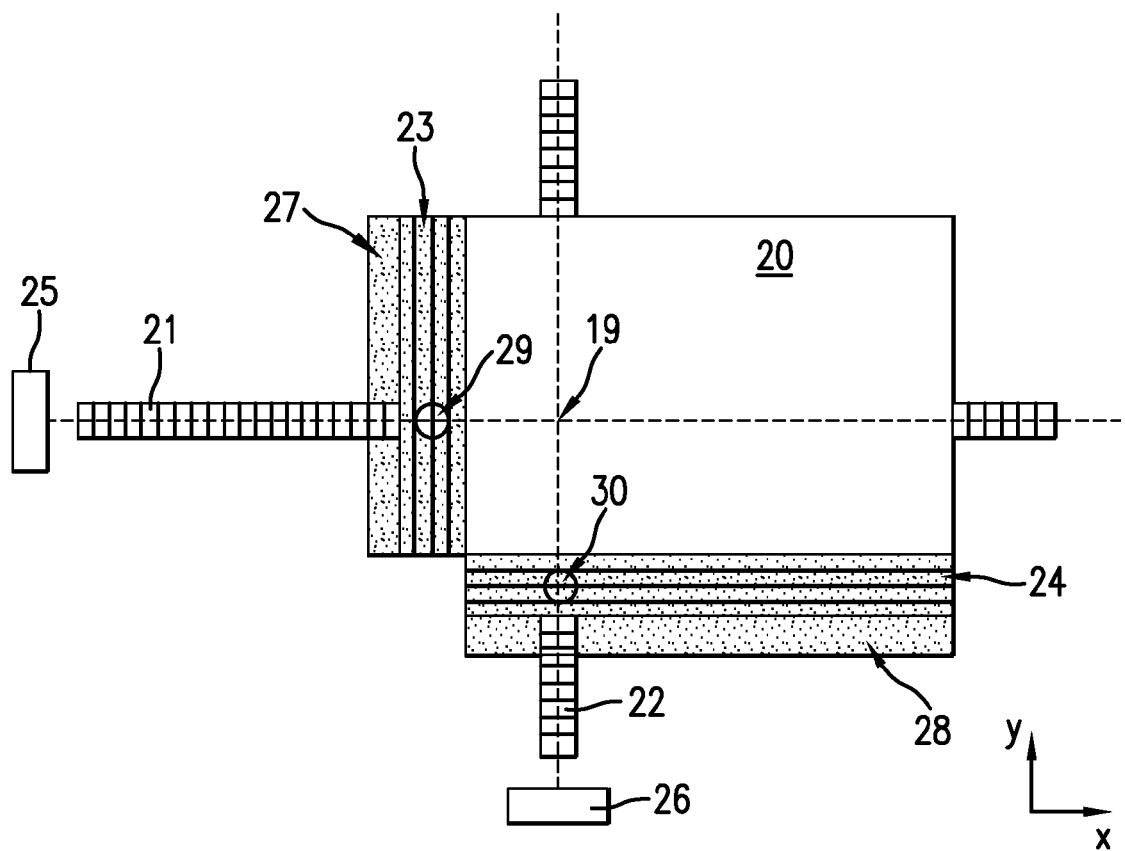
FIG. 1 schematically illustrates an overview of a position-measuring device.

Instead of interferometers, a position-measuring device according to FIG. 1 as described in PCT International Published Patent Application No. WO 2007/034379 uses what are referred to as grating interferometers.

Linear gratings, also referred to as scale gratings, are used for each measuring direction. The scale gratings extend in the respective measuring direction, scale grating 21 for the x-direction and scale grating 22 for the y-direction. Scanning gratings 23 and 24 needed for the optical scanning along the lines of a grating interferometer extend perpendicular to the respective measuring direction and are fixedly joined to moving object 20. Illumination and detection units 25, 26 for each axis are stationary and are not moved.

In order to direct the light for the measuring axes from the illumination units to scanning locations 29, 30, deflecting elements 27, 28 are used which extend perpendicular to the measuring directions and are joined to object 20 to be moved. These deflecting elements are also used to direct the light from the scanning locations back again to the detection units.

Example embodiments of the present invention are described in more detail below with reference to only the x-axis, it being understood that the following description is applicable to the y-axis as well.

Figure 2:
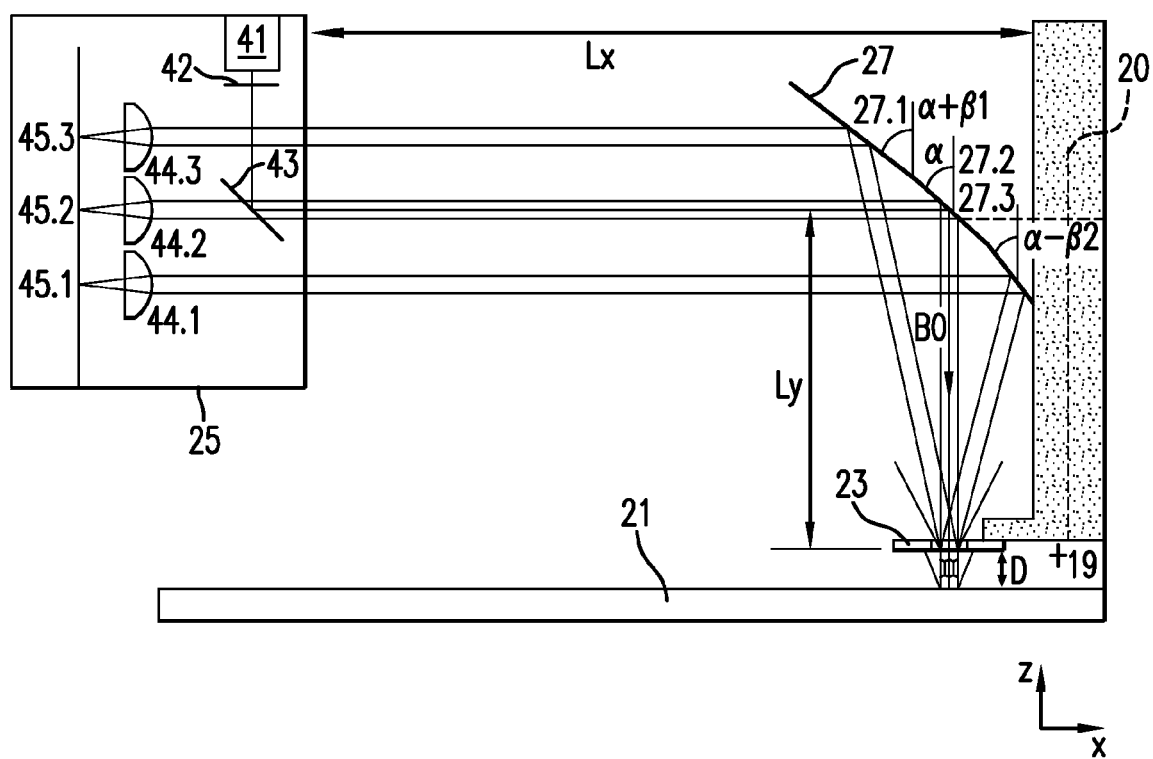
FIG. 2 schematically illustrates a beam path in a position-measuring device.

FIG. 2 schematically illustrates an exemplary embodiment of the present invention.

Located in illumination and detection unit 25 is a light source 41 (which, for example, may be a laser diode, an LED, etc.) whose light is collimated by element 42 (e.g., a lens) such that it exhibits only a small divergence in order to maintain the beam cross-section preferably unchanged in response to changing distances Lx between moved object 20 and illumination and detection unit 25. A deflecting element 43 directs the beam along measuring direction X to moved object 20 to be measured. Deflecting element 43 is aligned such that the extension of the beam in the x-direction intersects the normal of the x-y plane which goes through the center point. At the moved object to be measured, the beam arrives at a deflecting element 27 which extends perpendicular to the measuring direction over the entire length of the object to be measured or even beyond. The extension perpendicular to the measuring direction is to be selected according to the travel range perpendicular to the measuring direction.

Reflecting element 27, which may be a 45°-mirror, deflects the beam through 90°, so that light beam B0 penetrates a first grating 23. Similar to deflecting element 27, this first grating, also referred to as a scanning grating 23, extends perpendicular to the measuring direction and is fixedly joined to the object to be measured. The extension in the measuring direction is to be selected in accordance with deflecting element 27. Scanning grating 23 has long lines perpendicular to the measuring direction and takes the form of a transmission grating. It splits the incoming light beam into a plurality of partial beams. These partial beams travel to a second grating, also referred to as scale grating 21. The scale grating extends in the measuring direction and has lines perpendicular to the measuring direction whose length is precisely selected such that the incident light bundles can be completely scanned. The restriction of the scale grating in a manner perpendicular to the measuring direction is a great advantage, since it entails considerable expense to produce extended graduations in two dimensions. At the scale grating, further partial beams are produced from the partial beams. Since the scale grating is a reflection grating, the partial beams are redirected in the direction of the scanning grating, which performs a further splitting operation. After penetrating the scanning grating, partial-beam pairs B1, B2, B3, B4, B5, B6 (see FIG. 4) travel in defined, but partially different directions back to deflecting element 27. In so doing, partial-beam pair B2, B5 has a parallel direction with respect to the entering beam. The two partial beams B1, B3 have a direction in common, which deviates from that of B2, B5, however. The deviation is caused by the graduation period of the scanning grating. Partial beams B4, B6 have an angle in common, which is inverse to B, B3.

The scanning grating has properties precisely of the kind that phase-shifted signals are generated in the various directions of propagation when object 20 moves relative to scale grating 21. After traversing the scanning grating, the partial beams interfere, so that three signals, each shifted by 120°, are obtained.

Since the partial-beam pairs travel in a defined, but different direction back to deflecting element 27, it is arranged such that it has regions 27.1, 27.2 and 27.3 which produce different deflection angles. In this manner, all partial-beam pairs have the same direction when they travel back in the direction of detection unit 25. However, they are separated spatially, and with the aid of lenses 44.1, 44.2 and 44.3, are able to be focused on three photoelements 45.1, 45.2 and 45.3 where the phase-shifted signals are converted into phase-shifted photoelement currents. Fluctuations in the refractive index of the air play no role, since in each case they affect both components of a partial-beam pair in the same manner and are canceled in response to the interference.

The parallel positioning of the partial-beam pairs by deflecting element 27 is advantageous, since distance Lx between the detection unit and the object to be measured can vary between millimeters and meters. If all partial-beam pairs were deflected with the same angle, the location of incidence for the partial-beam pairs would be a function of distance Lx, that is, for large Lx, the partial-beam bundles would be directed to scale grating 21, and ultimately not reach detection unit 25.

Deflecting element 27 has regions exhibiting different deflection force in the measuring direction. In this connection, it is important that partial-beam pairs having the same phase shift arrive at the same deflection region. This means that at deflecting element 27, there must be a spatial separation of the partial-beam pairs having different phase shifts.

The necessary offset of the partial-beam pairs in the measuring direction at deflecting element 27 may be adjusted by distance Ly of deflecting element 27 to scanning grating 23. Ly may be ascertained with the aid of the scale-grating and scanning-grating graduation periods used, the extension of the illuminating beam in the measuring direction and spacing D between the gratings.

Figure 3:
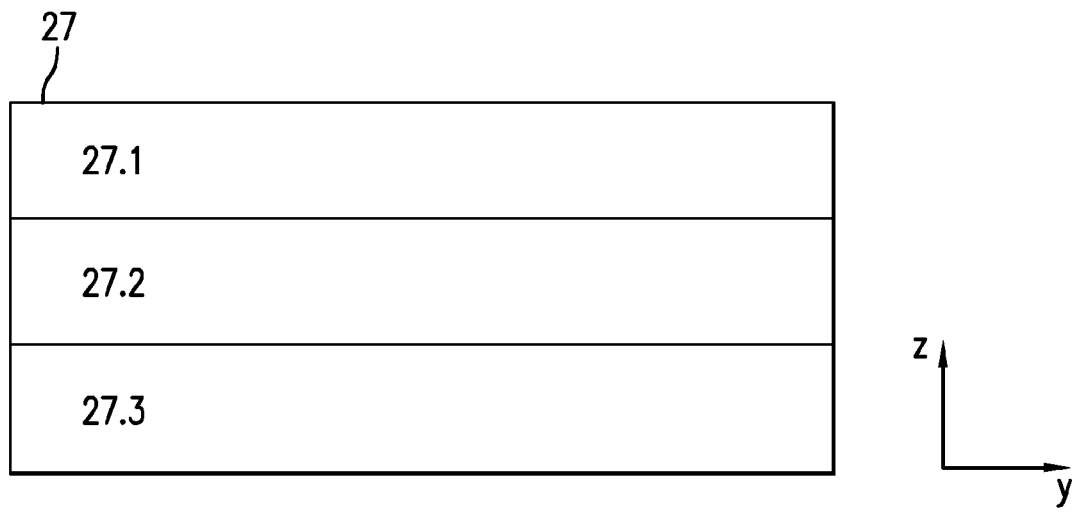
FIG. 3 schematically illustrates an apparatus for deflecting light beams.
Figure 3:
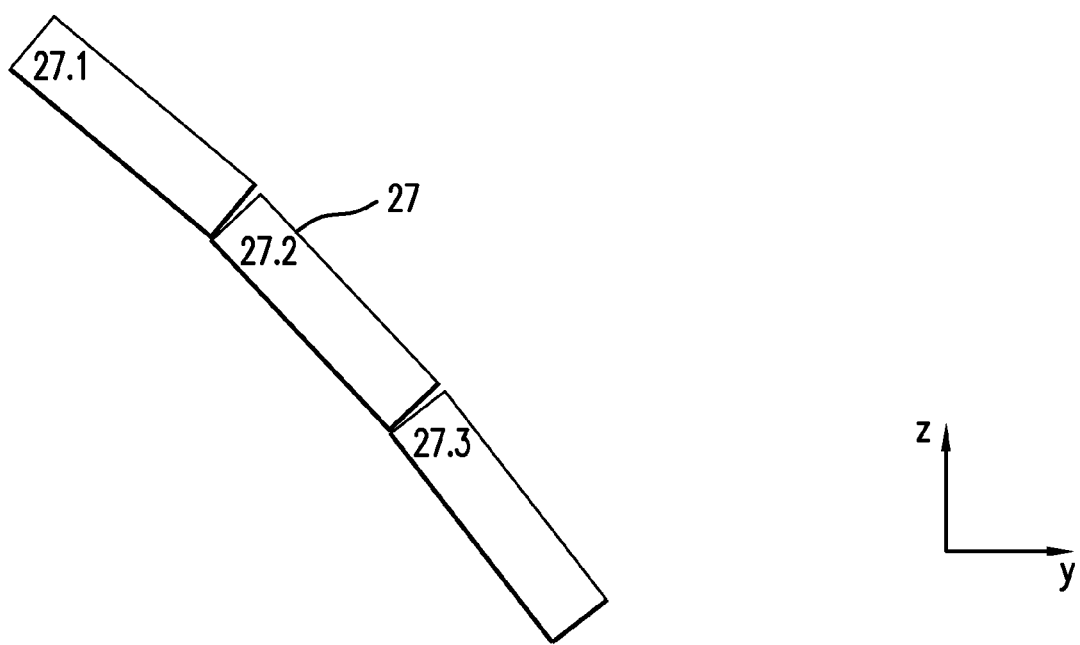

As illustrated in FIGS. 2 and 3, deflecting element 27 may be a segmented mirror. A middle element 27.2 has a plane mirror having a surface inclined by angle $\alpha$. Two outer elements 27.1 and 27.3 in each case feature a plane mirror having a surface inclined by angle $\alpha+\beta1$ and $\alpha-\beta2$, respectively.

Specific to the direction of B0, angle $\alpha$ may be 45°; and angles $\beta1$ and $\beta2$ are a function of the grating constants used for the scanning grating and scale grating. In general, $\beta1$ and $\beta2$ are identical ($\beta=\beta1=\beta2$) and are determined by the equation $$\beta = \frac{1}{2}\arcsin\left(\frac{\lambda}{TP\_AP}\right),$$

λ representing the wavelength of the light used, and TP_AP representing the graduation period of scanning grating 23.

The mirror may be produced from one piece. However, it may also be made of a plurality of coated lamellae secured to a substrate which predetermines the necessary angles α and β.

Except for high reflectivity, there are no special requirements with regard to the mirror surfaces.

In contrast to that, extended measuring reflectors for conventional interferometers must satisfy high demands with respect to the surface quality, since path-length differences, which are produced by surface variations of the measuring reflector, have some influence on the interference phase. Consequently, the position value generated is a function of the surface properties of the interferometer mirror, particularly when the object to be measured moves in a direction perpendicular to the measuring direction.

For the segmented deflecting mirror described, only reduced flatness and angle tolerances are necessary, so that it is a component inexpensive to manufacture.

Figure 7:
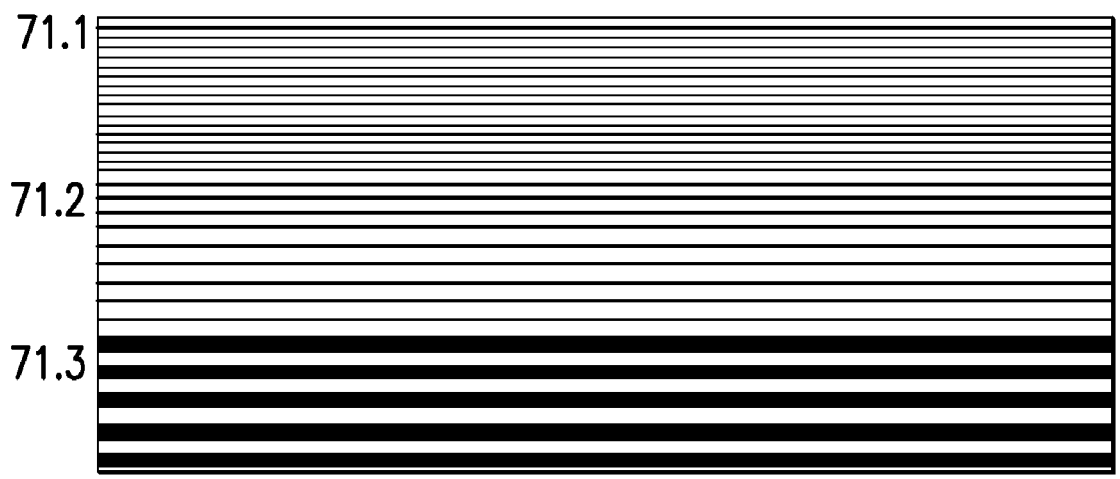
FIG. 7 schematically illustrates an alternative arrangement of a deflecting element.

In addition to a deflecting element 27 acting purely reflectively, an element is also possible which takes advantage of both the deflection by reflection as well as deflection by diffraction. Such an element 71 illustrated in FIG. 7 must have grating structures having different graduation periods in the measuring direction for the various deflecting regions 71.1, 71.2 and 71.3. Different deflection angles are produced by the different graduation periods. For this purpose, a reflective phase grating may be used which is tilted at an angle γ. To the greatest extent possible, the gratings should be of a strong 1st order, in order to be particularly effective. This may be provided by multi-step phase gratings.

In the following, the scanning and scale gratings used for two exemplary embodiments are described in greater detail.

In a first exemplary embodiment, scanning according to what is referred to as the LIP principle is used, as described basically, for example, in European Patent No. 0 163 362 mentioned above. The scanning grating has a graduation period of 4 μm, and is in the form of a transmitting phase grating. The maximum phase angle deviation is at 120°, and the grating lines are 1.25 μm wide. The scale grating is a reflective phase grating having a graduation period of 4 μm and a maximum phase angle deviation of 180°, as well as a line width of 2 μm. Given these properties, after the scanning grating has been traversed twice, signals S_0°, S_120° and S_240° phase-shifted by 120° are obtained.

The two partial beams B2, B5 form signal S_0° in the detector, the two partial beams B1, B3 form signal S_120°, and the two partial beams B4, B6 form signal S_240°.

Given an extension of the illumination field in the measuring direction of Bx=2 mm and a grating spacing D=2 mm:

$$Ly \geq \frac{2D\tan\left(\arcsin\left(\frac{\lambda}{TP\_AP}\right)\right) + Bx}{\tan\left(\arcsin\left(\frac{\lambda}{TP\_AP}\right)\right)}$$

is provided for the necessary distance Ly from the deflecting element to the scanning grating.

Moreover, since tilting tolerances of the object to be moved are also a factor, the separation in the measuring direction at the deflecting element should also take this into account, and Ly should be selected to be greater accordingly.

Figure 4:
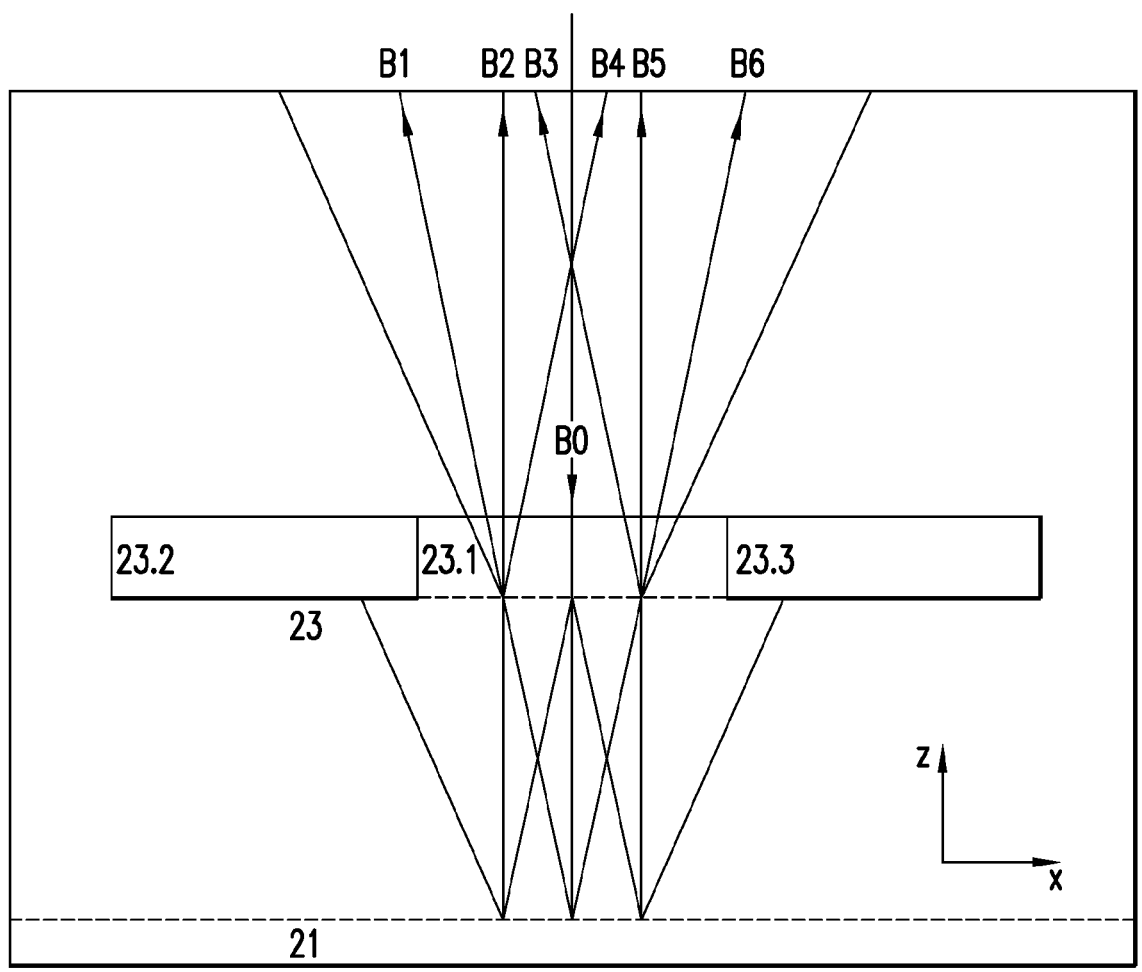
FIG. 4 schematically illustrates a beam path in a position-measuring device.
Figure 5:
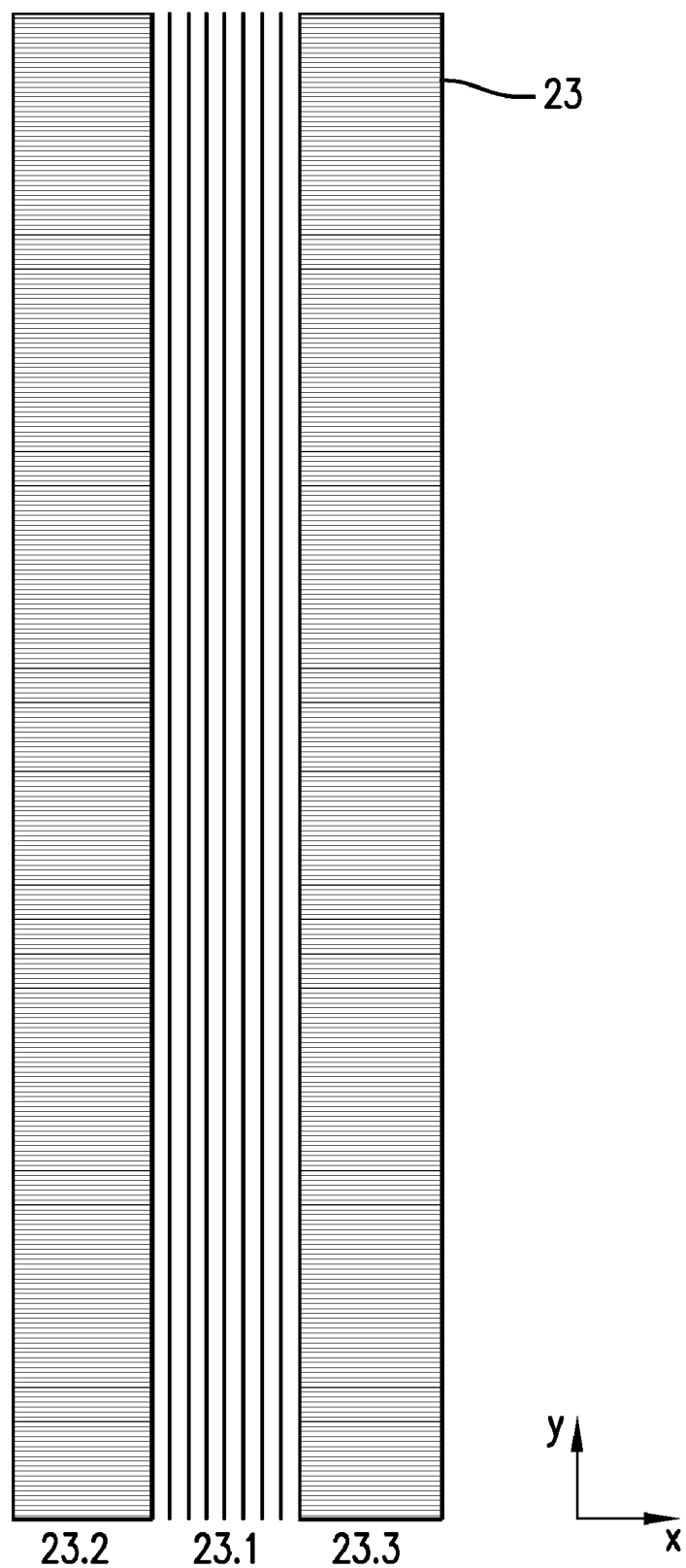
FIG. 5 schematically illustrates a scanning grating together with diaphragm stops.

In order to limit the number of partial-beam pairs with different directions of propagation traveling in the direction of the deflecting element, diaphragm stop structures 23.2 and 23.3 next to scanning grating 23.1 may be provided, as illustrated in FIGS. 4 and 5.

It may be particularly advantageous for both exemplary embodiments to place graduation structures 23.1 of scanning grating 23 on the side of the scanning-grating substrate facing scale grating 21. The effective measuring point of the measuring system is located in the scanning grating, and therefore it is located as close as possible to center point 19.

Figure 6:
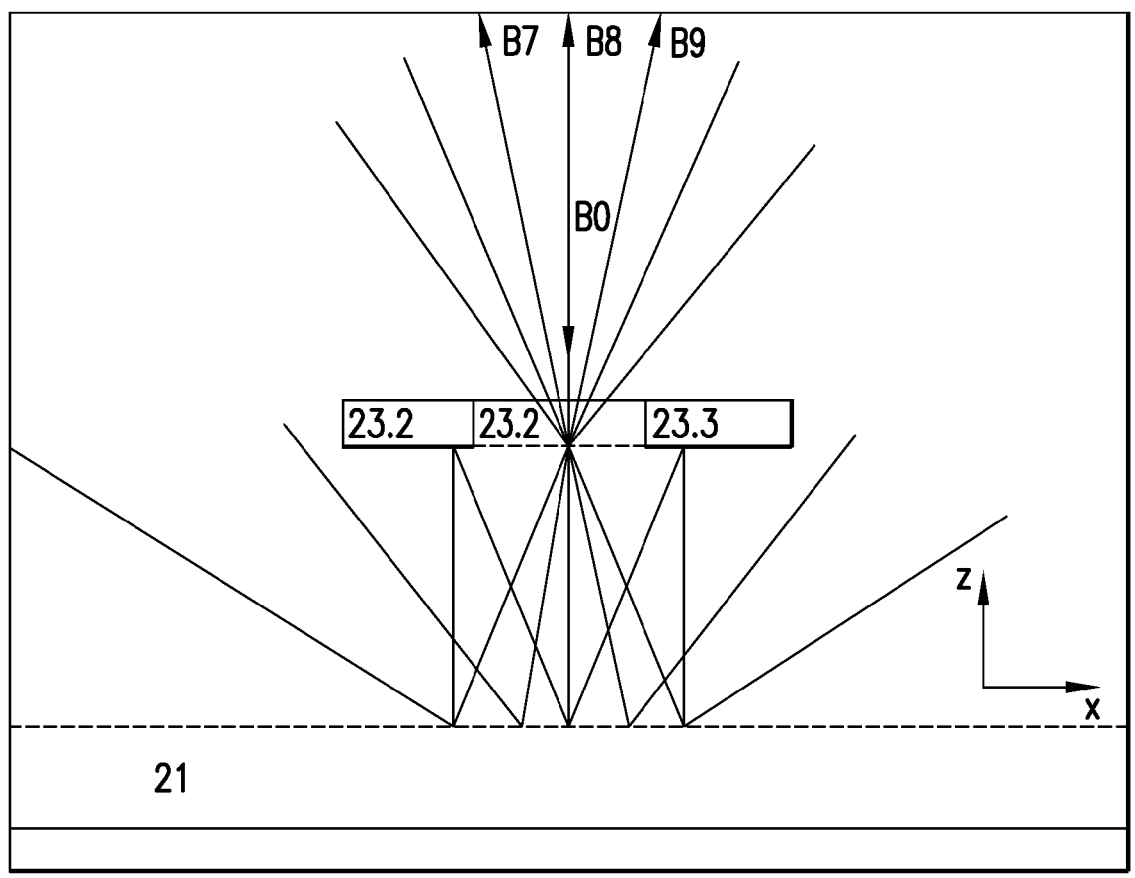
FIG. 6 schematically illustrates a further exemplary embodiment of a position-measuring device.

FIG. 6 schematically illustrates an exemplary embodiment, in which scanning according to the Littrow configuration is used.

The scanning grating has a graduation period of 4 μm, and is in the form of a transmitting phase grating. The maximum phase angle deviation lies at 120°, and the lines are 1.25 μm wide. The scale grating is a reflective phase grating having a graduation period of 2 μm and a maximum phase angle deviation of 180°, as well as a line width of 1 μm. Given these properties, after the scanning grating has been traversed twice, signals S_0°, S_120° and S_240° phase-shifted by 120° are obtained in the detector.

Partial-beam pair B8 forms signal S_0°, partial-beam pair B7 forms signal S_120° and partial-beam pair B9 forms signal S_240°.

Since in the case of a Littrow configuration, the 0th order of diffraction of the first grating is not desired (it leads to subharmonics), grating spacing D and the extension of the illumination in the measuring direction must be selected so that partial beams which result from a 0th order at the scanning grating, after diffraction at the scale, are blocked by non-transmitting regions next to the scanning grating. Therefore, diaphragm stop structures 23.2 and 23.3 next to scanning grating 23.1 may be provided for this exemplary embodiment, as well.

What is claimed is:

1. A position-measuring device, comprising:
   a light source;
   a first grating;
   a second grating;
   a detector; and
   a deflection device configured to direct light from the light source, split into partial beams of different directions at the first grating and the second grating, to the detector;
   wherein the deflection device includes different regions for incident partial beams having different directions to direct all partial beams from the deflection device to the detector approximately in parallel; and
   wherein the deflection device and the first grating are movable together with an object to be measured, and the second grating, the light source, and the detector are stationary.

2. The position-measuring device according to claim 1, wherein the different regions are differently inclined mirror surfaces of a segmented mirror.

3. The position-measuring device according to claim 2, wherein an inclination difference between the mirror surfaces is constant.

4. The position-measuring device according to claim 2, wherein the segmented mirror includes a plurality of coated lamellae secured on a substrate that predetermines different inclinations.

5. The position-measuring device according to claim 2, wherein the segmented mirror is an integral piece.

6. The position-measuring device according to claim 1, wherein the different regions include grating structures, each having different graduation periods.

7. The position-measuring device according to claim 6, wherein the grating structures of the different regions are arranged as reflective phase gratings.

8. The position-measuring device according to claim 6, wherein the grating structures of the different regions are arranged as multi-step phase gratings.

9. The position-measuring device according to claim 1, wherein one region of the deflection device is configured to direct the light from the light source to the first grating.

10. The position-measuring device according to claim 1, wherein the first grating is arranged as a transmitting phase grating.

11. The position-measuring device according to claim 1, wherein the second grating is arranged as a reflective phase grating to reflect light transmitted from the first grating back to the first grating.

12. The position-measuring device according to claim 1, further comprising diaphragm stop structures arranged on both sides of the first grating, the diaphragm stop structures are configured to partially block light reflected from the second grating.

13. The position-measuring device according to claim 1, wherein the deflection device includes three different regions arranged so that light on three spatially separate and parallel paths falls on three photodetectors.

14. The position-measuring device according to claim 13, wherein the three photodetectors are arranged to form signals out of phase by 120 degrees relative to each other.

15. A position-measuring device, comprising:
light source means;
first grating means;
second grating means;
detecting means; and
deflecting means for directing light from the light source means, split into partial beams of different directions at the first grating means and the second grating means, to the detecting means;
wherein the deflecting means includes different regions for incident partial beams having different directions to direct all partial beams from the defecting means to the detecting means approximately in parallel and
wherein the deflecting means and the first grating means are movable together with an object to be measured, and the second grating means, the light source means, and the detecting means are stationary.

* * * * *